(12) United States Patent
Showalter et al.

(10) Patent No.: US 8,533,679 B2
(45) Date of Patent: Sep. 10, 2013

(54) METHOD AND APPARATUS FOR INSERTING FAULTS TO TEST CODE PATHS

(75) Inventors: James L. Showalter, Los Gatos, CA (US); Michael R. Gabriel, Foster City, CA (US)

(73) Assignee: Intuit Inc., Mountain View, CA (US)

( * ) Notice: Subject to any disclaimer, the term of this patent is extended or adjusted under 35 U.S.C. 154(b) by 1454 days.

(21) Appl. No.: 11/655,570

(22) Filed: Jan. 18, 2007

(65) Prior Publication Data

US 2008/0178044 A1 Jul. 24, 2008

(51) Int. Cl.
*G06F 9/44* (2006.01)

(52) U.S. Cl.
USPC ............ 717/125; 717/124; 717/126; 717/127; 717/128; 717/129; 714/38; 714/41; 714/45

(58) Field of Classification Search
None
See application file for complete search history.

(56) References Cited

U.S. PATENT DOCUMENTS

| | | | | | |
|---|---|---|---|---|---|
| 5,490,249 | A | * | 2/1996 | Miller | 714/38 |
| 5,631,857 | A | * | 5/1997 | Kobrosly et al. | 702/194 |
| 5,960,196 | A | * | 9/1999 | Carrier et al. | 717/122 |
| 6,385,741 | B1 | * | 5/2002 | Nakamura | 714/38 |
| 6,477,666 | B1 | * | 11/2002 | Sanchez et al. | 714/41 |
| 6,701,460 | B1 | * | 3/2004 | Suwandi et al. | 714/41 |
| 2003/0037314 | A1 | * | 2/2003 | Apuzzo et al. | 717/125 |
| 2003/0110474 | A1 | * | 6/2003 | Ur et al. | 717/131 |
| 2004/0015867 | A1 | * | 1/2004 | Macko et al. | 717/125 |
| 2005/0081104 | A1 | * | 4/2005 | Nikolik | 714/38 |
| 2006/0015840 | A1 | * | 1/2006 | Marvel et al. | 717/101 |
| 2006/0294503 | A1 | * | 12/2006 | Henderson et al. | 717/131 |
| 2007/0124724 | A1 | * | 5/2007 | Irani | 717/106 |

* cited by examiner

*Primary Examiner* — Isaac Tecklu
(74) *Attorney, Agent, or Firm* — Park, Vaughan, Fleming & Dowle, LLP; Anthony P. Jones

(57) ABSTRACT

One embodiment of the present invention provides a system that inserts faults to test code paths. The system starts by placing fault-inserting method calls at join points within methods in program code. The system then executes the program code during a testing process. As a method is executed during the testing process, the system executes the corresponding fault-inserting method. This fault-inserting method checks a configuration database to determine whether a fault is to be simulated for the method and, if so, simulates a fault for the method.

17 Claims, 2 Drawing Sheets

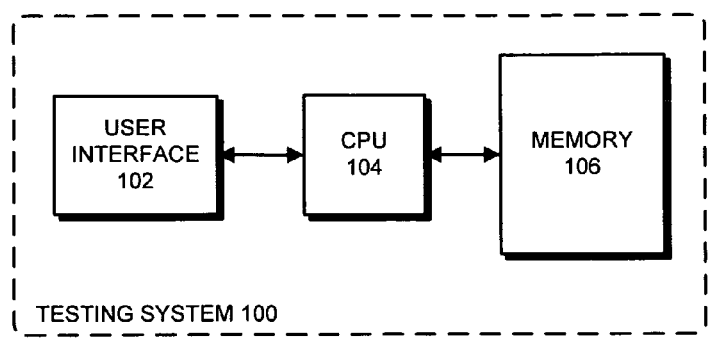
FIG. 1
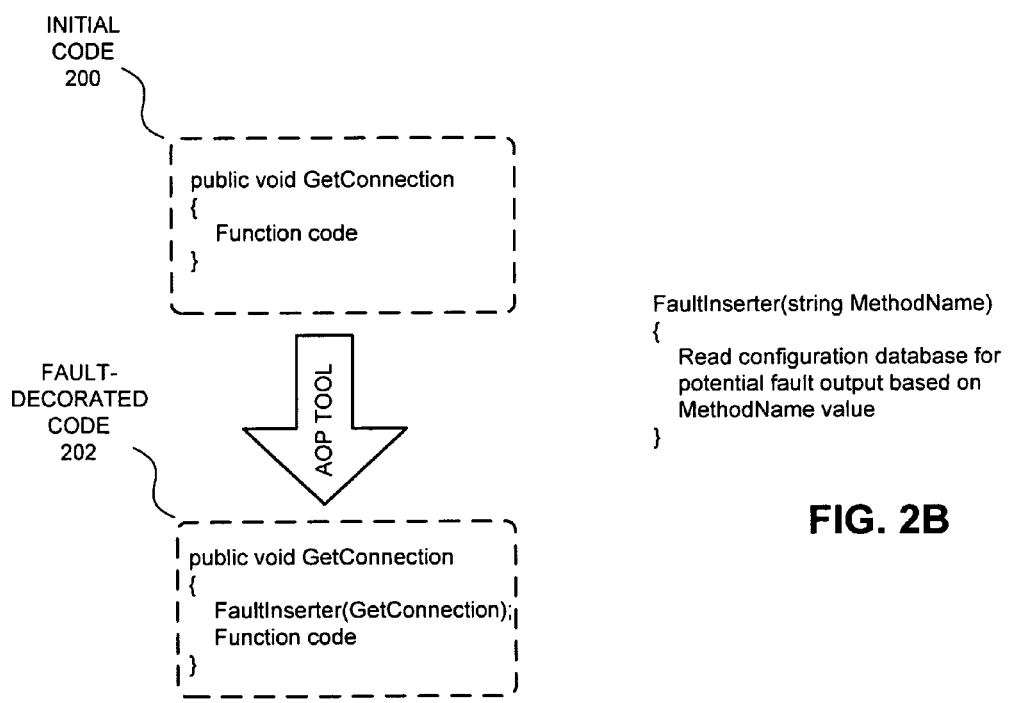
FIG. 2A
```
FaultInserter(string MethodName)
{
    Read configuration database for
    potential fault output based on
    MethodName value
}
```
FIG. 2B

METHOD AND APPARATUS FOR INSERTING FAULTS TO TEST CODE PATHS

BACKGROUND

Related Art

Software is commonly designed to deal with problems at runtime, such as users performing impermissible actions or computer systems encountering error conditions. For example, a user may enter a numerical character into a field that is intended for only alphabetical characters. Alternatively, the computer system can fail to obtain (or lose) a network connection or the computer system hardware can malfunction.

Because the software inevitably encounters such problems, programmers attempt to design software that handles these problems as gracefully as possible. Unfortunately, software projects are often developed by multiple teams, working at different locations, with varying levels of competency and varying levels of compliance with project-level error-handling requirements. Consequently, errors may not be handled correctly or consistently. Furthermore, a project may involve incremental extensions of enormous bodies of legacy code, which involves combining new code with old code. Therefore, developing proper test sequences to assure that all error paths are exercised can be very difficult. Hence, software projects may be released with a significant number of error paths that are untested.

Hence, what is needed is a method and apparatus for testing software without the above-described problem.

SUMMARY

One embodiment of the present invention provides a system that inserts faults to test code paths. The system starts by placing fault-inserting method calls at join points within methods in program code. The system then executes the program code during a testing process. As a method is executed during the testing process, the system executes the corresponding fault-inserting method. This fault-inserting method checks a configuration database to determine whether a fault is to be simulated for the method and, if so, simulates a fault for the method.

In a variation of this embodiment, the configuration database contains entries for methods in the program code, wherein each entry includes a value that corresponds to a fault.

In a variation of this embodiment, simulating a fault involves throwing an exception or returning an error code corresponding to a value stored in the configuration database.

In a variation of this embodiment, the system determines a set of exceptions that can be thrown and determines return codes that can be returned from each method in the program code. The system then generates an exceptions/returns database, wherein the exceptions/returns database contains entries for methods, and wherein the entries specify exceptions that can be thrown and return codes that can be returned from the method.

In a variation of this embodiment, the system uses the exceptions/returns database to create test paths in the program code.

In a variation of this embodiment, the system permits a tester to dynamically modify the configuration database during the testing process, wherein modifying the configuration database allows a tester to simulate a fault for at least one method during the testing process.

In a variation of this embodiment, the system permits a tester to statically modify a configuration file which serves as the configuration database before running the program code during the testing process.

In a variation of this embodiment, the program code can be executable code or source code.

BRIEF DESCRIPTION OF THE FIGURES

FIG. 1 illustrates testing system in accordance with an embodiment of the present invention.

FIG. 2A illustrates a GetConnection method which serves as the join point for the placement of an "advice" in accordance with an embodiment of the present invention.

FIG. 2B illustrates pseudocode for an exemplary FaultInserter method in accordance with an embodiment of the present invention.

DETAILED DESCRIPTION

Figure 3:
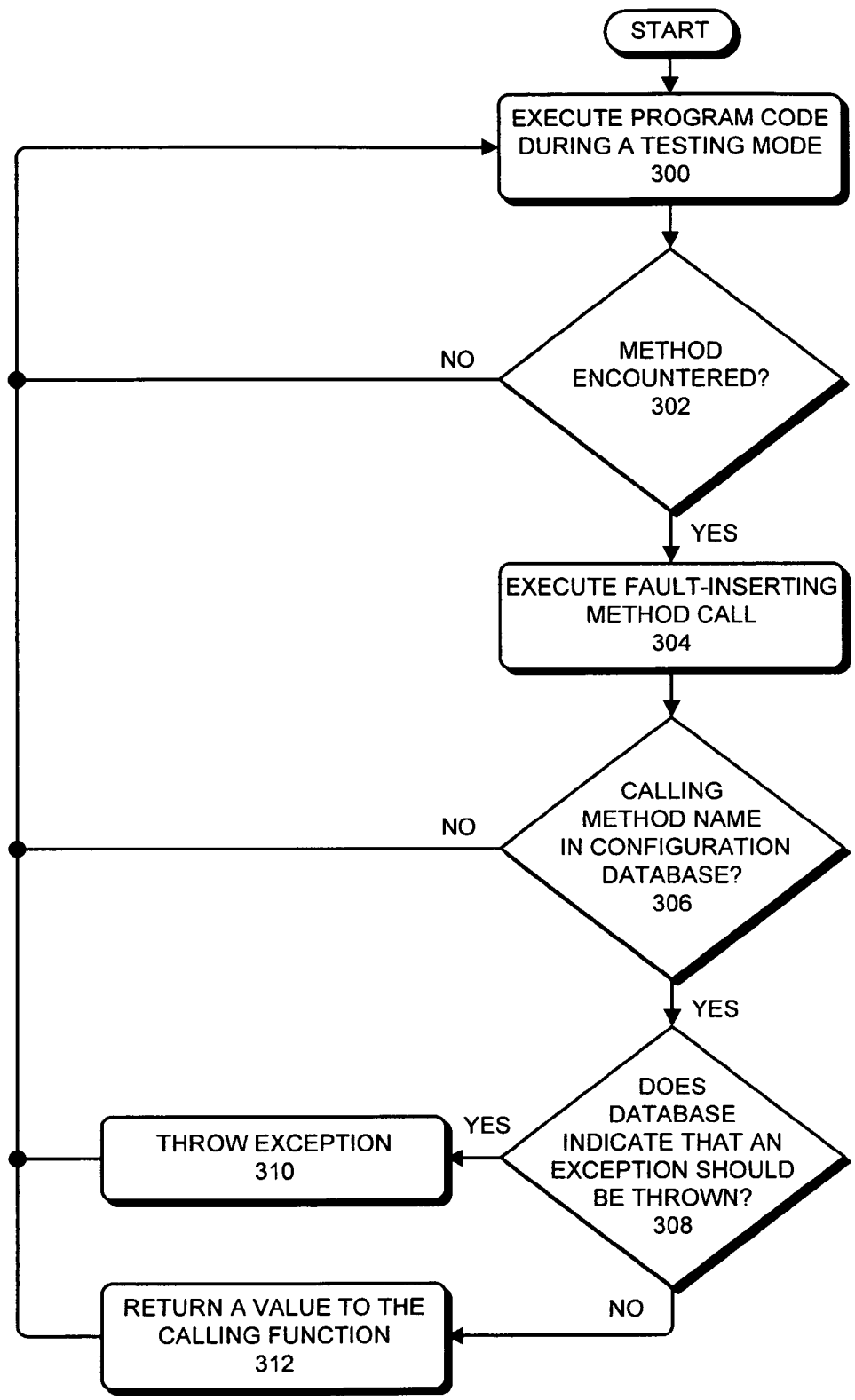
FIG. 3 presents a flowchart that illustrates the insertion of faults to test code paths accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Fault Inserter

FIG. 1 illustrates testing system 100 in accordance with an embodiment of the present invention. Testing system 100 includes user interface 102, central processing unit (CPU) 104, and memory 106. CPU 104 can be any type of general-purpose microprocessor(s) that execute(s) program code. Memory 106 contains data and program code for CPU 104. In one embodiment of the present invention, memory 106 includes program code for a program that is to be tested and a configuration database that is used during the testing process. User interface 102 allows user to communicate commands to and receive information from testing system 100 during the testing process.

In one embodiment of the present invention, testing system 100 is a white-box testing solution based on Aspect-Oriented Programming (AOP) and Reflection. In this embodiment, Reflection is used to build up an "exceptions/returns" database that contains every exception that is explicitly thrown from every method under test, plus every return code that is returned from every method under test. Testing system 100 can then use the exceptions/returns database to facilitate creating test paths to assure that the fault testing includes as many of the potential fault paths as possible.

In addition to creating the exceptions/returns database, AOP is used to insert an "advice" at a "join point" corresponding to every method under test. Note that in the AOP model, a "join point" is a point in a program where additional behavior (e.g., the simulation of a fault) can be usefully joined, whereas an "advice" is a mechanism for specifying code to run at a join point. For example, FIG. 2A illustrates a GetConnection method which serves as the join point for the placement of an "advice" in accordance with an embodiment of the present invention. Before the advice is joined, the GetConnection method includes only the code required by the method (as shown by initial code 200). An AOP software tool (such as AspectJ by the Eclipse Project or Spring by Interface 21) is then run on the method. The AOP tool modifies the GetConnection method to include an advice (i.e., the method call) related to the insertion of faults. Hence, after the AOP tool is run, the GetConnection method includes a call to the FaultInserter method (as shown in fault-decorated code 202).

FIG. 2B illustrates an exemplary pseudocode FaultInserter method in accordance with an embodiment of the present invention. During operation, the FaultInserter method checks the configuration database stored in memory 106 to see if the corresponding MethodName method is supposed to be faulted during the current testing and, if so, what form the faulting should take (i.e., whether to return a particular error code or to throw a particular exception).

In one embodiment of the present invention, the configuration database is stored in a data structure in memory 106 that can be modified on-the-fly, allowing a user to direct testing system 100 to cause faults in selected methods while the test is being run. In an alternative embodiment, the user places entries corresponding to the selected methods in a configuration file before testing the program. Testing system 100 then reads the file during the testing process and faults the selected methods. In both embodiments, the user also enters the type of fault that testing system 100 uses to fault a selected method.

In one embodiment of the present invention the fault can be set to be random, in which case any one of the exceptions the method throws can be thrown or any one of the error codes the method returns can be returned. In an alternative embodiment, testing system 100 iterates through each exception and each returned error code in turn. Running a suite of tests against a system faulted in this way can cause many or all error-handling paths to be exercised. Note that in these embodiments, the exceptions/returns database can be used to select exceptions or error codes corresponding to the method.

In another embodiment of the present invention, exceptions and error codes known to be thrown or returned from libraries linked into the code under test can be simulated without replacing or altering the linked-in libraries in any way. (Note that this is a significant advantage compared to, for example, using interfaces and providing faulted concrete implementations of those interfaces at runtime). Furthermore, exceptions and error codes that aren't even possible can be thrown or returned, in order to test completely unexpected behavior.

Note that some embodiments of testing system 100 work better for exceptions than for return codes, because determining by Reflection when a return value is non-erroneous vs. erroneous is not always possible. Hence, testing system 100 sometimes returns values indicating success, which does not exercise error paths. In this embodiment, repeated execution of tests with the mode set to random eventually overcomes this problem (i.e., eventually error codes are returned instead of success codes). In an alternative embodiment, if a design project standardizes return codes, this information can be added to the database in order to return only codes indicating errors.

Testing Code

FIG. 3 presents a flowchart that illustrates the insertion of faults to test code paths in accordance with an embodiment of the present invention. The process starts when testing system 100 executes program code during a testing mode (step 300). For the purposes of illustration, we assume that the program code has already been modified using an AOP tool in a "static" or "offline" mode. Hence, the AOP tool has modified the classes to include the advice related to the insertion of faults (i.e., the call to the FaultInserter method) at the correct point-cuts. However, in an alternative embodiment, the AOP tool can run in a "dynamic" or "online" mode. In this embodiment, the AOP tool can be run as an extension of the low-level classloading mechanism part of the Java Virtual Machine (JVM), allowing the AOP tool to intercept all classloading calls and transform the bytecode on the fly.

Unless testing system 100 encounters a method call (step 302), testing system 100 returns to step 300 to continue to execute program code in the testing mode. If testing system 100 encounters a method call, testing system 100 executes the call to the FaultInserter method that was placed by the AOP tool at the start of each method under test (step 304). The FaultInserter method determines if the method name (see "MethodName" in FIG. 2B) is included in the configuration database (step 306). If the configuration database does not include the method's name, the method is not currently to be faulted and testing system 100 returns to step 300 to continue to execute program code in the testing mode.

Otherwise, the FaultInserter method reads the configuration database to determine how the method is to be faulted. If the configuration database indicates that the method should appear to throw an exception (step 308), the FaultInserter method throws the exception (step 310). Otherwise, the method should return a value that makes it appear as if the method encountered an error. In this case, the FaultInserter method returns the corresponding value to the method (step 312). The method then returns this value, making it appear as if the method had encountered the corresponding error condition. Testing system 100 then returns to step 300 to continue executing program code in the testing mode.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for inserting faults to test code paths, comprising:

placing fault-inserting method calls at join points in methods in program code;

executing the program code during a testing process; and as a method is executed during the testing process, executing the corresponding fault-inserting method, wherein the fault-inserting method checks a configuration database to determine whether a fault is to be simulated for the method and, if so, simulates a fault for the method, wherein simulating the fault for the method comprises:

determining whether an entry for the method in the configuration database indicates that the method should appear to throw an exception that is known to be thrown for the method or return an error code that is known to be returned for the method;

when the entry indicates that the method should appear to throw the exception, simulating the fault by using the fault-inserting method to throw the exception; and otherwise, when the entry indicates that the method should appear to return the error code, simulating the fault by using the fault-inserting method to return the error code to the method.

2. The method of claim 1, wherein the configuration database contains entries for methods in the program code, wherein each entry includes a value that corresponds to a fault.

3. The method of claim 2, wherein using the fault-inserting method to throw the exception comprises throwing the exception based on a value for the entry stored in the configuration database, and
wherein using the fault-inserting method to return the error code to the method comprises returning the error code based on a value for the entry stored in the configuration database.

4. The method of claim 1, wherein the method further comprises:
determining a set of exceptions that can be thrown and determining return codes that can be returned from each method in the program code; and
generating an exceptions/returns database, wherein the exceptions/returns database contains entries for the methods, wherein the entries in the exceptions/returns database specify exceptions that can be thrown and return codes that can be returned from the method.

5. The method of claim 4, wherein the method further comprises using the exceptions/returns database to create test paths in the program code.

6. The method of claim 1, wherein the method further comprises statically modifying a configuration file which serves as the configuration database before running the program code during the testing process.

7. The method of claim 1, wherein the program code can be compiled code or source code.

8. The method of claim 1, wherein using the fault-inserting method to throw the exception comprises running code for the fault-inserting method that causes the exception to be thrown.

9. The method of claim 1, wherein the method further comprises:
determining whether an entry in the configuration database for a library that is used in the program code indicates that a library should appear to throw an exception that is known to be thrown for the library or return an error code that is known to be returned for the library;
when the entry for the library indicates that the library should appear to throw the exception, simulating the fault by using the fault-inserting method to throw the exception; and
otherwise, when the entry for the library indicates that the library should appear to return the error code, simulating the fault by using the fault-inserting method to return the error code to the method,
wherein the method does not involve replacing the library and does not involve altering the library.

10. An apparatus for inserting faults to test code paths, comprising:
a processor;
an execution mechanism on the processor;
a memory coupled to the processor, wherein the memory stores data and program code for the processor;
a configuration database in the memory, wherein the configuration database contains entries for methods in the program code, wherein each entry includes a value that corresponds to a fault;
a placement mechanism configured to place fault-inserting method calls at join points in methods in program code;
wherein the execution mechanism is configured to:
execute the program code during a testing process;
while executing a method during the testing process, execute the corresponding fault-inserting method, wherein executing the fault-inserting method causes the execution mechanism to check the configuration database to determine whether a fault is to be simulated for the method and, if so, the execution mechanism is configured to simulate a fault for the method, wherein, while simulating the fault for the method, the execution mechanism is configured to:
determine whether an entry for the method in the configuration database indicates that the method should appear to throw an exception that is known to be thrown for the method or return an error code that is known to be returned for the method;
when the entry indicates that the method should appear to throw the exception, simulate the fault by using the fault-inserting method to throw the exception; and
otherwise, when the entry indicates that the method should appear to return the error code, simulate the fault by using the fault-inserting method to return the error code to the method.

11. The apparatus of claim 10, wherein the execution mechanism is configured to:
determine a set of exceptions that can be thrown and determine return codes that can be returned from each method in the program code;
create test paths in the program code based in part on the exceptions/returns database, wherein the entries in the exceptions/returns database specify exceptions that can be thrown and return codes that can be returned from the method.

12. The apparatus of claim 10, wherein, while using the fault-inserting method to throw the exception, the execution mechanism is configured to use a value for the entry stored in the configuration database, and
wherein, while using the fault-inserting method to return the error code, the execution mechanism is configured to return the error code based on a value for the entry stored in the configuration database.

13. A computer-readable storage medium storing instructions that when executed by a computer cause the computer to perform a method for inserting faults to test code paths, comprising:
placing fault-inserting method calls at a join points in methods in program code;
executing the program code during a testing process; and
as a method is executed during the testing process, executing the corresponding fault-inserting method, wherein the fault-inserting method checks a configuration database to determine whether a fault is to be simulated for the method and, if so, simulating a fault for the method, wherein simulating the fault for the method comprises:
determining whether an entry for the method in the configuration database indicates that the method should appear to throw an exception that is known to be thrown for the method or return an error code that is known to be returned for the method;

when the entry indicates that the method should appear to throw the exception, simulating the fault by using the fault-inserting method to throw the exception; and otherwise, when the entry indicates that the method should appear to return the error code, simulating the fault by using the fault-inserting method to return the error code to the method.

14. The computer-readable storage medium of claim 13, wherein the configuration database contains entries for methods in the program code, wherein each entry includes a value that corresponds to a fault.

15. The computer-readable storage medium of claim 14, wherein using the fault-inserting method to throw the exception comprises throwing the exception based on a value for the entry stored in the configuration database, and wherein using the fault-inserting method to return the error code to the method comprises returning the error code based on a value for the entry stored in the configuration database.

16. The computer-readable storage medium of claim 13, wherein the method further comprises:

determining a set of exceptions that can be thrown and determining return codes that can be returned from each method in the program code;

generating an exceptions/returns database, wherein the exceptions/returns database contains entries for the methods in the program code, wherein the entries in the exceptions/returns database specify exceptions that can be thrown and return codes that can be returned from the method.

17. The computer-readable storage medium of claim 13, wherein the method further comprises statically modifying a configuration file which serves as the configuration database before running the program code during the testing process.

* * * * *